United States Patent
Maatta (10) Patent No.: US 7,647,081 B2
(45) Date of Patent: Jan. 12, 2010

(54) ELECTRONIC DEVICE SLIDING MECHANISM

(75) Inventor: Esa-Sakari Maatta, Viiala (FI)

(73) Assignee: Nokia Corporation, Espoo (FI)

( * ) Notice: Subject to any disclaimer, the term of this patent is extended or adjusted under 35 U.S.C. 154(b) by 647 days.

(21) Appl. No.: 11/436,203

(22) Filed: May 16, 2006

(65) Prior Publication Data
US 2007/0270198 A1 Nov. 22, 2007

(51) Int. Cl.
*H04M 1/00* (2006.01)
(52) U.S. Cl. .................. 455/575.4; 455/575.1
(58) Field of Classification Search ............. 455/575.4, 455/575.1
See application file for complete search history.

(56) References Cited

U.S. PATENT DOCUMENTS

| | | | | |
|---|---|---|---|---|
| 6,950,316 B2 * | 9/2005 | Pan et al. | | 361/814 |
| 7,269,451 B2 * | 9/2007 | Kwon | | 455/575.4 |
| 2005/0000059 A1 | 1/2005 | Sung et al. | | |
| 2005/0059443 A1 | 3/2005 | Pan et al. | | |
| 2005/0079902 A1 * | 4/2005 | Chen et al. | | 455/575.4 |
| 2005/0124398 A1 * | 6/2005 | Lee et al. | | 455/575.4 |
| 2006/0079301 A1 * | 4/2006 | Kim et al. | | 455/575.3 |

FOREIGN PATENT DOCUMENTS

| | | |
|---|---|---|
| EP | 1545099 | 6/2005 |
| JP | 2003/348204 | 12/2003 |
| WO | WO 2004/112267 | 12/2004 |

* cited by examiner

*Primary Examiner*—Barry W Taylor
(74) *Attorney, Agent, or Firm*—Alfred A. Fressola; Ware, Fressola, Van Der Sluys & Adolphson LLP

(57) ABSTRACT

The invention relates to a sliding mechanism and in particular to a sliding mechanism for an electronic device. The sliding mechanism comprises a first part and a second part, the first and second parts being slidably movable relative to one another between a first configuration and a second configuration; the first and second parts including respective first and second magnetic elements, the magnetic elements being arranged to attract one another to bias the first and second parts towards the first configuration.

12 Claims, 7 Drawing Sheets

ELECTRONIC DEVICE SLIDING MECHANISM

The invention relates to a sliding mechanism and in particular to a sliding mechanism for an electronic device. Although specific embodiments may relate to a sliding mechanism for handheld electronic devices comprising radiotelephone functionality, other embodiments may not include radiotelephone functionality. Electronic devices may alternatively or additionally include audio/still image/video recording/playing functionality.

BACKGROUND OF THE INVENTION

Electronic devices, particularly user-portable radiotelephones (e.g. mobile cellular phones), often comprise two separate parts which can be slid between an open configuration in which a keypad, display and/or other user interface elements (including one or more connectivity ports e.g. USB ports) can be accessed and a closed configuration in which the keypad/display and/or other user interface elements are not accessible. More generally, sliding mechanisms for electronic devices allow a compact design facilitating user portability and may not necessarily hide user interface elements in the closed configuration.

SUMMARY OF THE INVENTION

According to a first aspect, the present invention provides an electronic device sliding mechanism comprising
- a first part and a second part, the first and second parts being slidably movable relative to one another between a first configuration and a second configuration;
- the first and second parts including respective first and second magnetic elements, the magnetic elements being arranged to attract one another to bias the first and second parts towards the first configuration.

In one embodiment, the second part includes a third magnetic element spaced apart from the second magnetic element and arranged to attract the first magnetic element to allow biasing of the first and second parts towards the second configuration, the magnetic elements defining bistable first and second configurations of the first and second parts.

In another embodiment, the second part includes one or more further magnetic elements arranged to attract the first magnetic element to bias the first and second parts towards one or more further configurations, the magnetic elements thereby defining multistable configurations of the first and second parts.

In another embodiment, the second part includes a fourth magnetic element positioned between the second and third magnetic elements and arranged to repel the first magnetic element thereby to reinforce the bistable first and second configurations.

In another embodiment, the second part includes a third magnetic element arranged to repel the first magnetic element thereby to reinforce the bias towards the first configuration.

The sliding mechanism may include guide portions for constraining the first and second parts to move between the first and second configurations, the first and second magnetic elements being integral with the guide portions. The magnetic elements may be integrally housed in the guide portions. The guide portions may comprise a guide rail and a runner, one or more of the magnetic elements being positioned at discrete locations internal to the guide rail and internal to the runner.

The magnetic elements may be magnetic inserts. The magnetic elements may be electromagnetic elements. The magnetic elements may be magnetic/electromagnetic coatings applied at discrete locations on said first and second parts.

The first part may be arranged to comprise a display and the second part may be arranged to comprise one or more user input elements, and the mechanism may be arranged such that the first part overlies one or more of the user input elements in the first configuration. The user input elements may be one or more keys/keypads, joysticks, roller balls, displays. The user input elements allow a user to control one or more functions of the electronic device. All the user input elements on the second part may be overlain in the first configuration or a substantial portion of the user input elements may be overlain in the first configuration.

The first part may be arranged to comprise a display and the second part may be arranged to comprise one or more user input elements, and the mechanism may be arranged such that the first part reveals one or more of the user input elements in the second configuration. All the user input elements on the second part may be revealed in the second configuration or a substantial portion of the user input elements may be revealed in the second configuration.

According to a second aspect, the present invention provides an electronic device comprising a sliding mechanism, the sliding mechanism comprising a first part and a second part, the first and second parts being slidably movable relative to one another between a first configuration and a second configuration;
- the first and second parts including respective first and second magnetic elements, the magnetic elements being arranged to attract one another to bias the first and second parts towards the first configuration.

According to a third aspect, the present invention provides an electronic device sliding mechanism comprising
- a first part and a second part, the first and second parts being slidably movable relative to one another between a first configuration and a second configuration;
- the first and second parts including respective first and second means for magnetically biasing, the means for magnetically biasing being arranged to attract one another to bias the first and second parts towards the first configuration.

Any embodiment or aspect of the invention may include shielding to prevent magnetic fields from disrupting the functioning of electronic and/or electrical components within the electronic device.

The present invention includes one or more aspects, embodiments and/or features of said aspects and/or embodiments in various combinations whether or not specifically stated in that combination.

BRIEF DESCRIPTION OF THE DRAWINGS

In order that the invention may more readily be understood, a description is now given, by way of example only, reference being made to the accompanying drawings, in which:—

FIGS. 3*a-e* show a third embodiment of the invention.

DETAILED DESCRIPTION OF THE INVENTION

In the following description, each feature which is identical to that of another embodiment is given the same reference number.

For ease of understanding, the following description includes relative terms such as "left" and "right", but it is to be understood that the function of the invention is not limited to the specific orientations described.

Figure 1A:
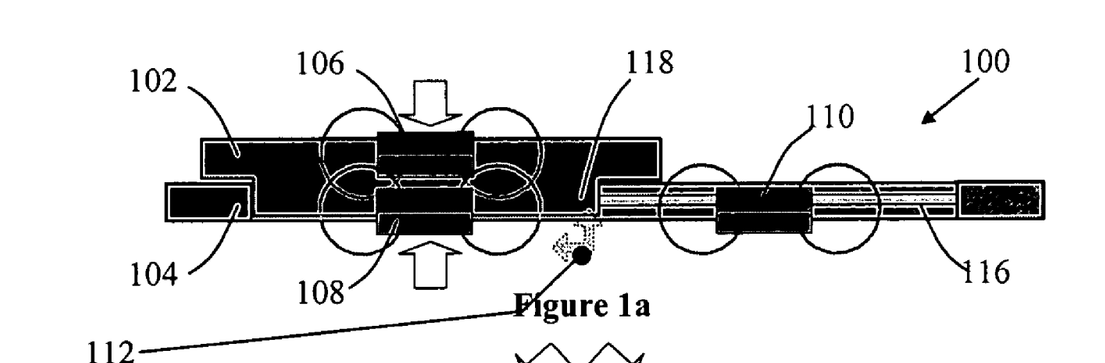
FIGS. 1*a-c* show a first embodiment of the invention.
Figures 1B, 1C:
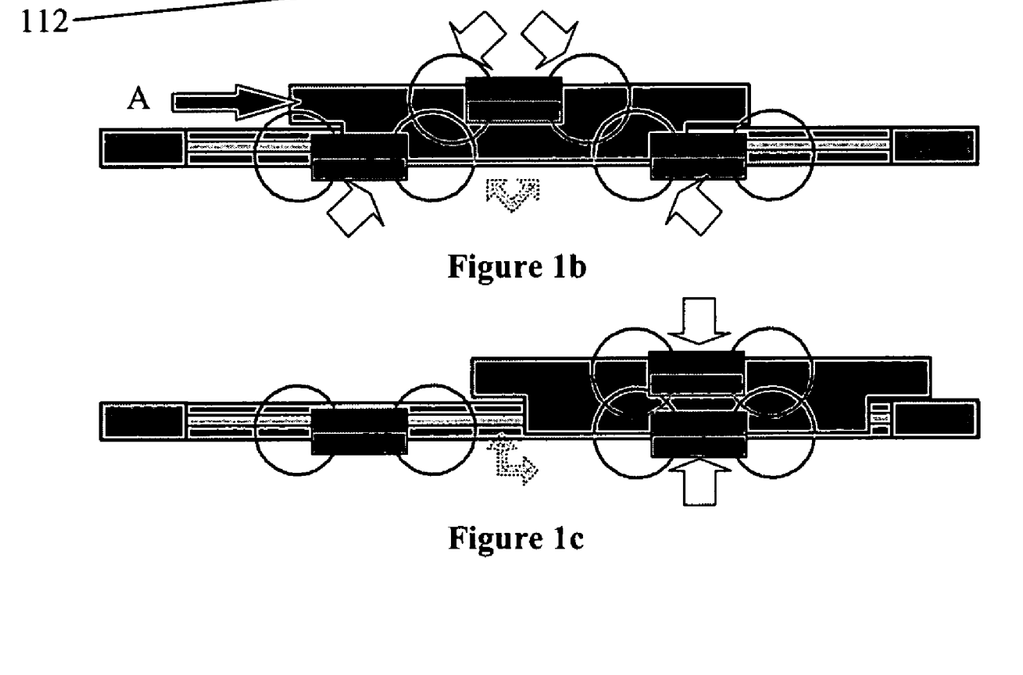

FIGS. 1a-c show a sliding mechanism 100 according to a first embodiment of the invention.

The sliding mechanism 100 is intended for use with an electronic device such as a user-portable handheld radiotelephone (e.g. a mobile cellular phone), and includes a first part 102 and a second part 104.

The first part 102 is slidably movable relative to the second part 104 between a first configuration and a second configuration. In the first configuration, the first part 102 is positioned adjacent a left-hand end of the second part 104, as shown in FIG. 1a, and, in the second configuration, the first part 102 is positioned adjacent a right-hand end of the second part, as shown in FIG. 1c.

Figure 6:
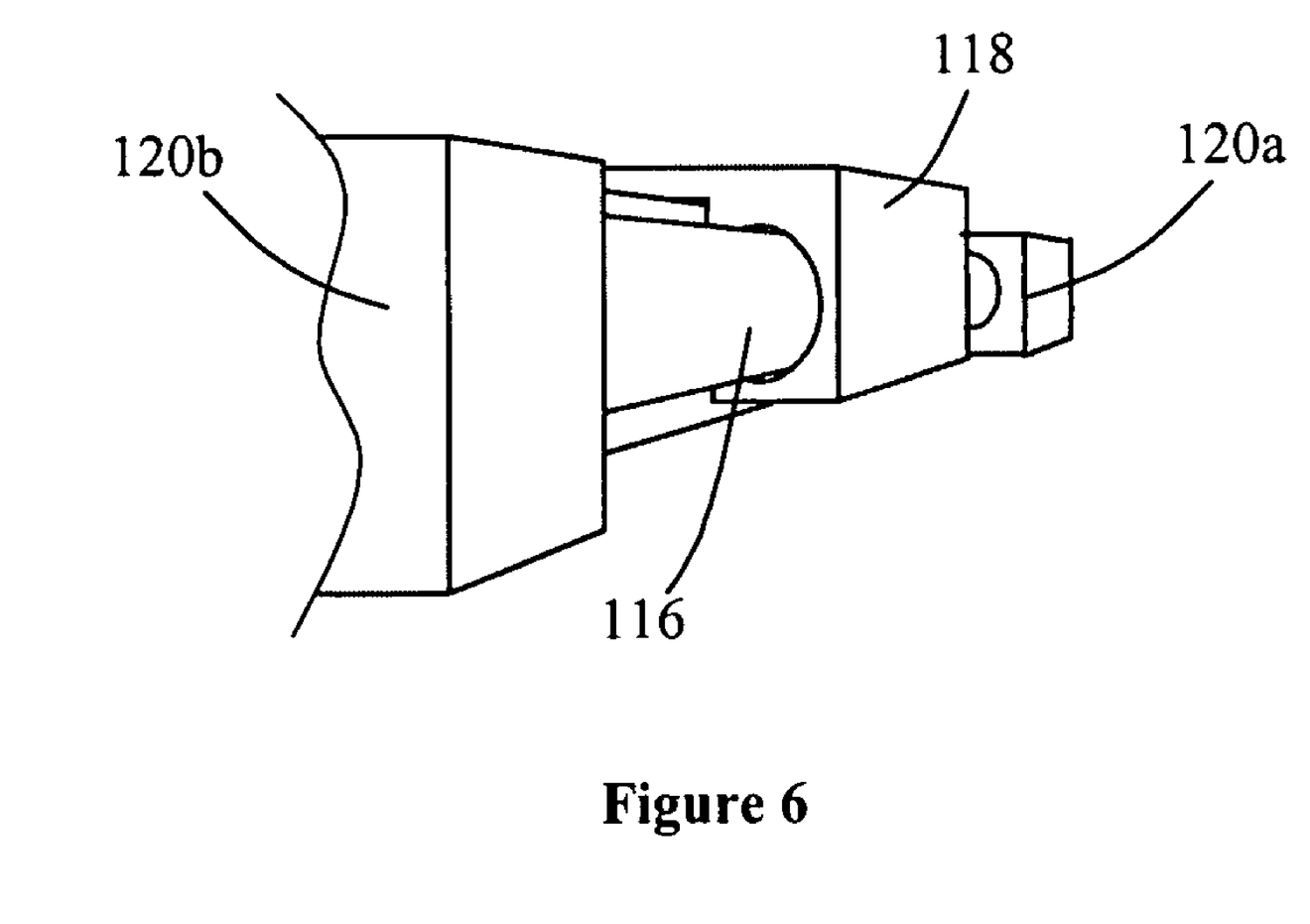
FIG. 6 shows a guide portion according to the invention.

The sliding mechanism 100 includes a pair of guide portions for constraining the first and second parts 102, 104 to move between the first and second configurations. Referring to FIG. 6, each guide portion comprises a guide rail 116, which forms part of the second part 104, a runner 118, which forms part of the first part 102, and stops 120a and 120b at either end of the guide rail 116 which prevent the runner 118 from detaching from the guide rail 116.

Referring again to FIG. 1, the first part 102 includes a first magnetic element 106. The second part 104 includes second and third magnetic elements 108, 110 being spaced from one another. In this embodiment, the magnetic elements are discrete permanent magnets attached to the first and second parts 102, 104. The magnetic elements are shown in FIG. 1 as located in front of the first and second parts 102, 104 for illustrative purposes only. It will be apparent that the magnetic elements will be located so as not to interfere with the movement of the first and second parts 102, 104 relative to each other. The first and second magnetic elements 106, 108 are arranged to attract one another and to bias the first and second parts 102, 104 towards the first configuration. The first and third magnetic elements 106, 110 are arranged to attract one another and to bias the first and second parts towards the second configuration. In this way, the first and second configurations are bistable configurations of the first and second parts 102, 104.

The sliding mechanism 100 includes a locking device 112 to lock the first and second parts 102, 104 in a configuration intermediate the first and second configurations, as shown in FIG. 1b.

In use, the user is able to move the first and second parts 102, 104 between the first and second configurations by applying a force to those parts. For example, as seen in FIGS. 1a-c, the user is able to move the first and second parts 102, 104 from the first configuration to the second configuration by applying a force to the first part 102 in the direction indicated by arrow A, whilst keeping the second part 104 stationary. This involves moving the first part 102 against the bias provided by the attractive force between the first and second magnetic elements 106, 108. When the first part 102 reaches a point at which the attractive force between the first and third magnetic elements 106, 110 is greater than that between the first and second magnetic elements 106, 108, first and third magnetic elements 106, 110 move the first and second parts 102, 104 into the second configuration with little or no assistance from the user. It will be apparent that the first and second parts 102, 104 can be moved back into the first configuration by applying a force to the first part 102 in the direction opposite to that indicated by arrow A.

The user may lock the first and second parts 102, 104 in the intermediate configuration shown in FIG. 1b using the locking device 112. The locking device 112 once unlocked can be used to move the first part 102 relative to the second part 104 into either the first or second configuration.

Figure 2A:
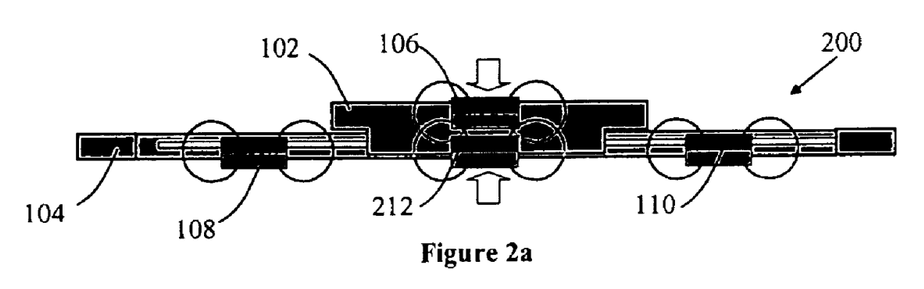
FIGS. 2*a-c* show a second embodiment of the invention.
Figure 2B:
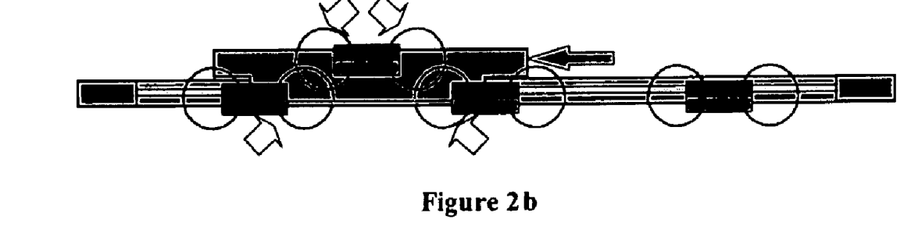
Figure 2C:
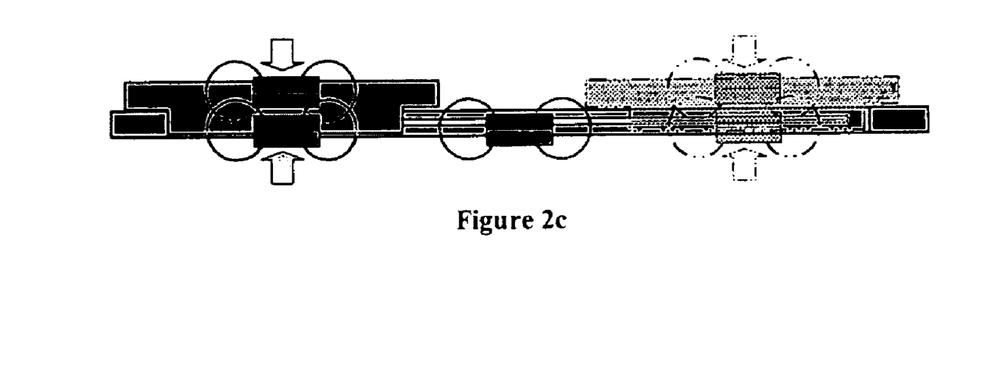

FIGS. 2a-c show a sliding mechanism 200 according to a second embodiment of the invention.

The second part 104 of the sliding mechanism 200 includes a fourth magnetic element 212 positioned between, and spaced from, the second and third magnetic elements 108, 110, and arranged to attract the first magnetic element 106 and to bias the first and second parts 102, 104 towards a third configuration intermediate the first and second configurations, as shown in FIG. 2a. The first and second configurations are as those in the first embodiment and are shown respectively in solid and in dotted lines in FIG. 2c. In this way, the first, second and third configurations of the sliding mechanism are multistable configurations.

FIGS. 3a-e show a sliding mechanism 300 according to a third embodiment of the invention.

The second part 104 includes a fourth magnetic element 312 positioned between, and spaced from, the second and third magnetic elements 108, 110, and arranged to repel the first magnetic element 106.

Figures 3, 3D:
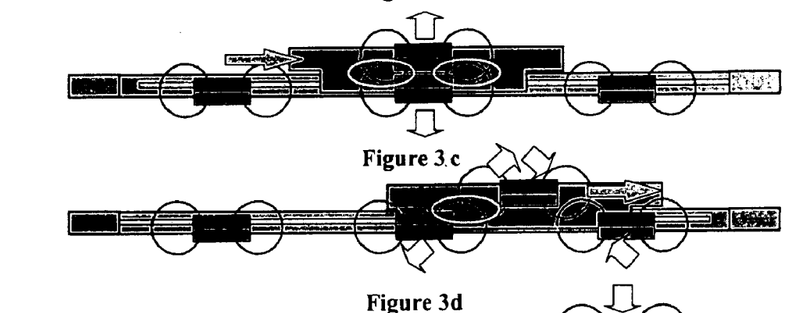
Figure 3A:
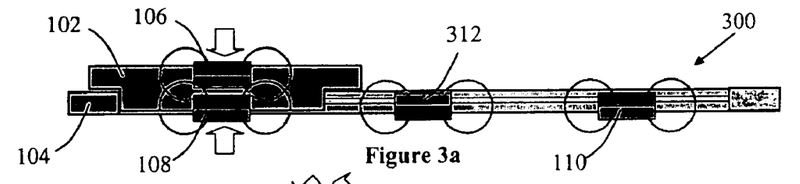
Figure 3B:
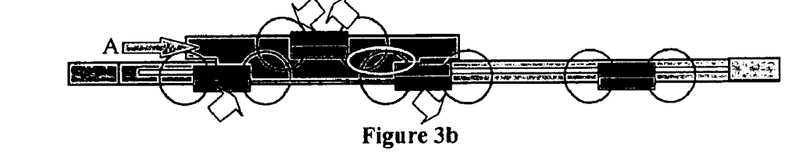
Figure 3E:
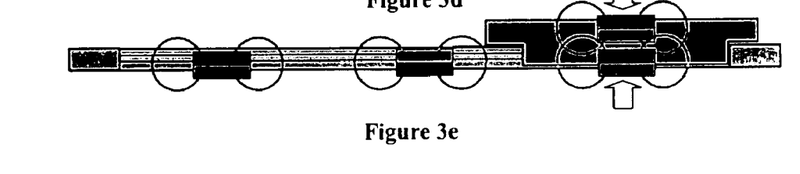
Figure 4A:
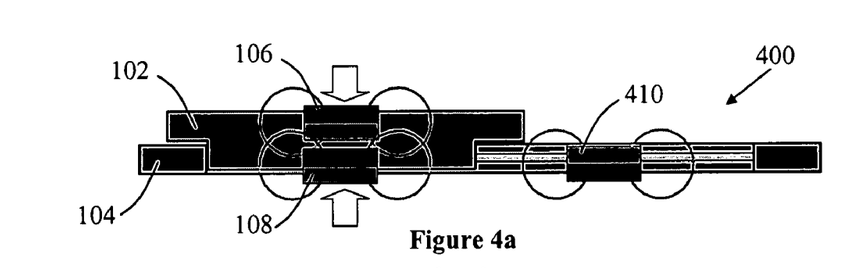
FIGS. 4*a-d* show a fourth embodiment of the invention.
Figure 4B:
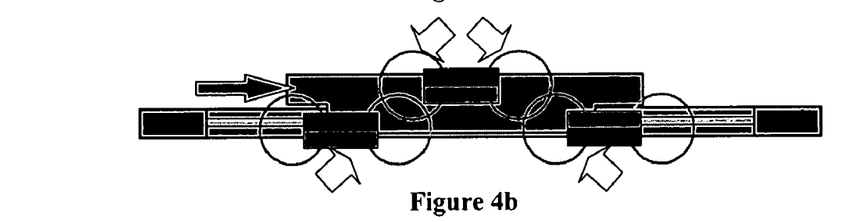
Figure 4C:
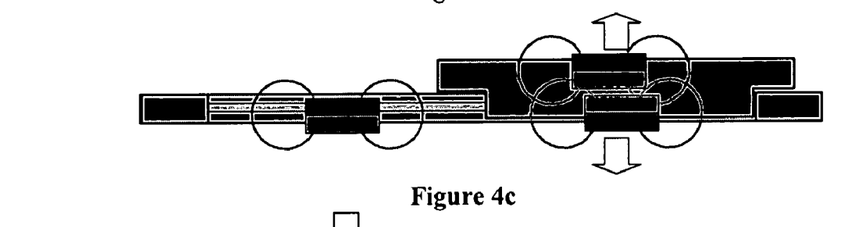
Figure 4D:
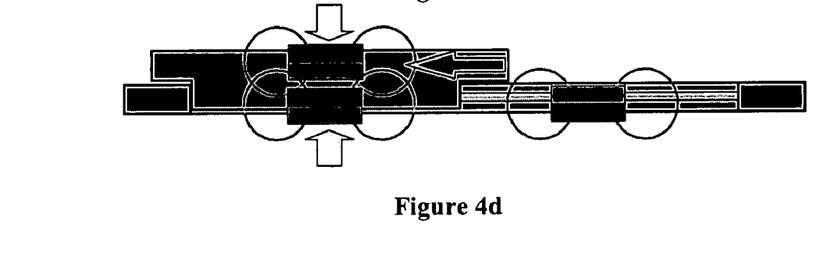
Figure 5A:
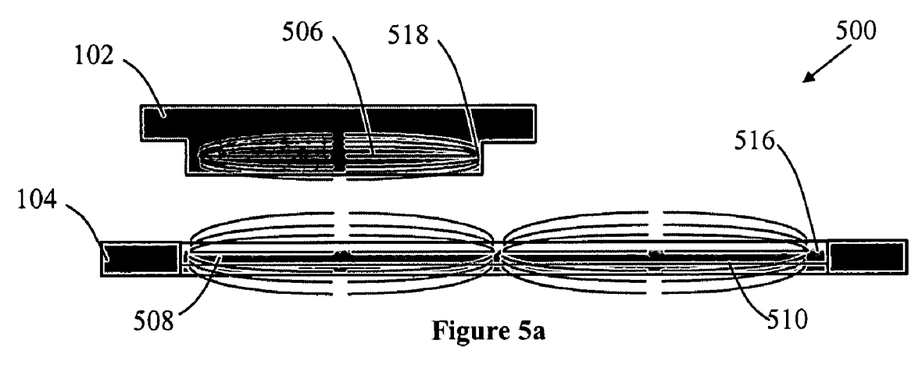
FIGS. 5*a-d* show a fifth embodiment of the invention.
Figure 5B:
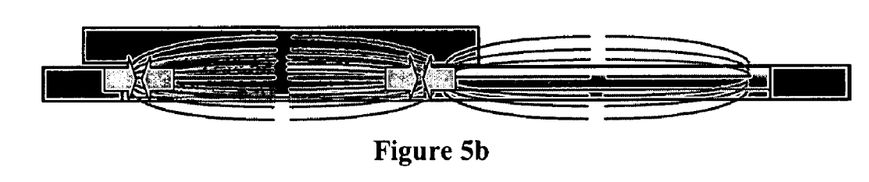
Figure 5C:
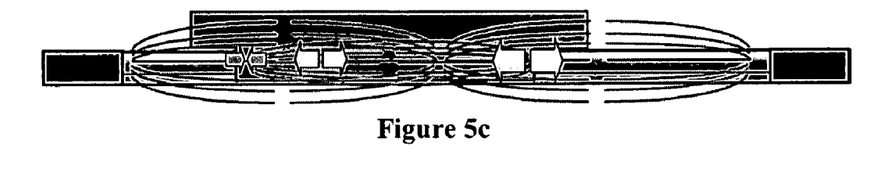
Figure 5D:
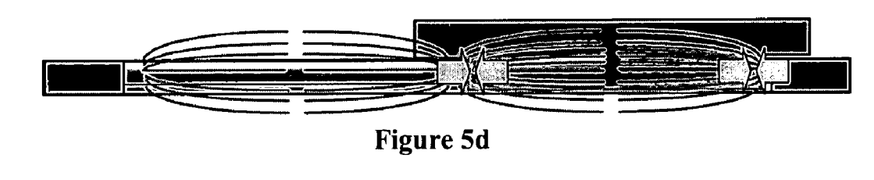

The sliding mechanism is shown in the first configuration in FIG. 3a. As seen in FIGS. 3b to 3d, during movement from the first configuration to the second configuration, the first magnetic element is repelled by the fourth magnetic element 312. The repulsion initially acts against the force applied by the user (in the direction of arrow A), until the first and fourth magnetic elements 106, 312 become aligned, at which point the repulsion begins to assist the user, in conjunction with the attraction between the first and third magnetic elements 106, 110, in moving the first and second parts 102, 104 into the second configuration, as shown in FIG. 3e.

In this way, the fourth magnetic element 312 serves to reinforce the bistable first and second configurations of the first and second parts 102, 104.

In the second and third embodiments, the existence of the fourth magnetic element may depend on the length of the first and second parts and on the size and/or strength of the magnetic elements.

FIGS. 4a-d show a sliding mechanism 400 according to a fourth embodiment of the invention.

In this embodiment, the third magnetic element 410 is arranged to repel the first magnetic element 106. In this way, the sliding mechanism 400 is not stable in the second configuration such that the first configuration is a monostable configuration.

FIGS. 5a-d show a sliding mechanism 500 according to a fifth embodiment of the invention.

In this embodiment, the first magnetic element 506 is integrally formed with the runner 518 of the first part 102, while the second and third magnetic elements 508, 510 are integrally formed with the guide rails 516 of the second part 104. Specifically, the magnetic elements are integrally housed at discrete locations internal to the guide rails 516 and the runner 518.

Figure 7:
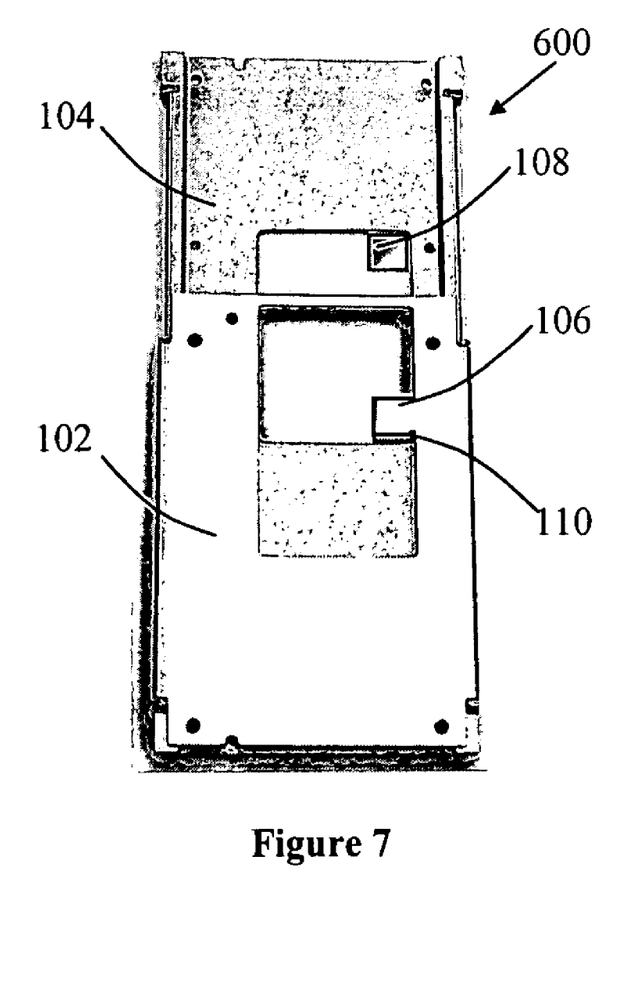
FIG. 7 shows an electronic device in the sliding mechanism of the invention may be incorporated.

FIG. 7 shows an electronic device 600 in which the sliding mechanism of any embodiment of the invention may be incorporated.

As seen in FIG. 7, the magnetic elements 106, 108, 110 are attached to inner faces of a housing of the electronic device 600.

Shielding may be provided in the electronic device to protect the electronic components of the device from being (e.g. detrimentally) affected by the magnetic field of the magnetic elements. In other embodiments, the magnetic elements may be electromagnetic elements. The biasing function described herein may be provided by permanent magnets of various types and may also be provided by electromagnetic/magnetic coatings applied to respective surfaces.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electronic device sliding mechanism comprising a first part and a second part, the first and second parts being slidably movable relative to one another between at least three configurations; wherein:
the first part comprises a first magnetic element, and
the second part comprises a further three or more magnetic elements, and wherein:
each of the further magnetic elements defines a particular configuration of the device,
each of the further magnetic elements is configured to attract the first magnetic element to bias the first and second parts towards their respective configurations, the magnetic elements thereby defining multi-stable configurations of the first and second parts, and
the second part comprises one or more reinforcing magnetic elements positioned between at least two of the further magnetic elements, the reinforcing elements being configured to repel the first magnetic element thereby to reinforce the multi-stable configurations.

2. The sliding mechanism of claim 1, wherein the one or more reinforcing magnetic elements are configured to have a polarity corresponding to the first magnetic element to thereby repel the first magnetic element, so as to reinforce the multi-stable configurations.

3. The sliding mechanism of claim 1 including guide portions for constraining the first and second parts to move between the respective configurations, the first magnetic element and further magnetic elements being integral with the guide portions.

4. The sliding mechanism of claim 3 wherein the magnetic elements are integrally housed in the guide portions.

5. The sliding mechanism of claim 3 wherein the guide portions comprise a guide rail and a runner, one or more of the first and further magnetic elements being positioned at discrete locations internal to the guide rail and internal to the runner.

6. The sliding mechanism of claim 1, wherein the first part is configured to comprise a display and the second part is configured to comprise one or more user input elements, the mechanism configured such that the first part overlies one or more of the user input elements in the first configuration.

7. The sliding mechanism of claim 1, wherein the first part is configured to comprise a display and the second part is configured to comprise one or more user input elements, the mechanism configured such that the first part reveals one or more of the user input elements in the second configuration.

8. The sliding mechanism of claim 1, wherein the magnetic elements are magnetic inserts.

9. The sliding mechanism of claim 1, wherein the magnetic elements are electromagnetic inserts.

10. The sliding mechanism of claim 1, wherein the magnetic elements are coatings applied to the first and second parts at discrete locations.

11. An electronic device comprising a sliding mechanism, the sliding mechanism comprising:
a first part and a second part, the first and second parts being slidably movable relative to one another between at least three configurations; wherein:
the first part comprises a first magnetic element, and
the second part comprises a further of three or more magnetic elements, and wherein:
each of the further magnetic elements defines a particular configuration of the device,
each of the further magnetic elements is configured to attract the first magnetic element to bias the first and second parts towards their respective configurations, the magnetic elements thereby defining multi-stable configurations of the first and second parts, and
the second part comprises one or more reinforcing magnetic elements positioned between at least two of the further magnetic elements, the reinforcing elements being configured to repel the first magnetic element thereby to reinforce the multi-stable configurations.

12. An electronic device sliding mechanism comprising a first part and a second part, the first and second parts being slidably movable relative to one another between at least three configurations wherein;
the first part comprises a first means for magnetically biasing, and the second part comprises a further three or more means for magnetically biasing, and wherein:
   each of the further means for magnetically biasing is configured to attract the first means for magnetically biasing to bias the first and second parts towards their respective configurations, the means for magnetically biasing thereby defining multi-stable configurations of the first and second parts, and the second part comprises one or more means for magnetically reinforcing positioned between at least two of the means for magnetically biasing, the means for magnetically reinforcing being configured to repel the first means for magnetically biasing thereby to reinforce the multi-stable configurations.

* * * * *

UNITED STATES PATENT AND TRADEMARK OFFICE
CERTIFICATE OF CORRECTION

PATENT NO. : 7,647,081 B2  Page 1 of 1
APPLICATION NO. : 11/436203
DATED : January 12, 2010
INVENTOR(S) : Esa-Sakari Maatta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twenty-eighth Day of December, 2010

David J. Kappos
*Director of the United States Patent and Trademark Office*